(12) United States Patent
Von Aswege

(10) Patent No.: US 11,841,004 B2
(45) Date of Patent: Dec. 12, 2023

(54) CONTROLLER AND CONTROL METHOD FOR A WIND TURBINE

(71) Applicant: Wobben Properties GmbH, Aurich (DE)

(72) Inventor: Enno Von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/295,320

(22) PCT Filed: Nov. 22, 2019

(86) PCT No.: PCT/EP2019/082244
§ 371 (c)(1),
(2) Date: May 19, 2021

(87) PCT Pub. No.: WO2020/104664
PCT Pub. Date: May 28, 2020

(65) Prior Publication Data
US 2022/0010772 A1 Jan. 13, 2022

(30) Foreign Application Priority Data
Nov. 23, 2018 (DE) ..................... 10 2018 129 622.3

(51) Int. Cl.
*F03D 7/02* (2006.01)
*F03D 7/04* (2006.01)
(52) U.S. Cl.
CPC .......... *F03D 7/0276* (2013.01); *F03D 7/028* (2013.01); *F03D 7/0224* (2013.01); *F03D 7/048* (2013.01);
(Continued)

(58) Field of Classification Search
CPC ...... F03D 7/0224; F03D 7/0276; F03D 7/028; F03D 7/048; F05B 2270/101;
(Continued)

(56) References Cited

U.S. PATENT DOCUMENTS 4,189,648 A * 2/1980 Harner ...................... F03D 9/25
416/41
5,652,485 A * 7/1997 Spiegel ................... F03D 7/046
322/17
(Continued)

FOREIGN PATENT DOCUMENTS

DE 2903819 A1 8/1980
DE 10062025 C1 7/2002
(Continued)

*Primary Examiner* — Tulsidas C Patel
*Assistant Examiner* — Thomas K Quigley
(74) *Attorney, Agent, or Firm* — SEED INTELLECTUAL PROPERTY LAW GROUP LLP

(57) ABSTRACT

A controller structure for a wind turbine having an aerodynamic rotor with at least one rotor blade, wherein the controller structure is designed to control a rotation speed of the rotor of the wind turbine, wherein the controller structure is designed as a cascade control arrangement and has an outer control loop and an inner control loop, wherein the inner control loop receives an input signal which comprises a change in the rotation speed, an acceleration of the rotation speed, a function of the change in the rotation speed and/or a function of the acceleration of the rotation speed.

19 Claims, 2 Drawing Sheets

(52) U.S. Cl.
CPC . *F05B 2270/101* (2013.01); *F05B 2270/1033* (2013.01); *F05B 2270/327* (2013.01); *F05B 2270/328* (2013.01); *F05B 2270/335* (2013.01); *F05B 2270/705* (2013.01)

(58) Field of Classification Search
CPC ........ F05B 2270/1033; F05B 2270/327; F05B 2270/328; F05B 2270/335; F05B 2270/705
See application file for complete search history.

(56) References Cited

U.S. PATENT DOCUMENTS

| | | | |
|---|---|---|---|
| 6,756,762 B2 | 6/2004 | Focking | |
| 7,942,634 B2* | 5/2011 | Christensen | F03D 7/046 416/37 |
| 8,237,301 B2* | 8/2012 | Delmerico | F03D 7/043 290/44 |
| 9,140,238 B2* | 9/2015 | Bjerge | F03D 7/028 |
| 9,341,159 B2* | 5/2016 | Koerber | F03D 7/0224 |
| 9,631,606 B2* | 4/2017 | Slack | F03D 7/0276 |
| 9,719,493 B2* | 8/2017 | Pineda Amo | F03D 7/0224 |
| 9,784,241 B2* | 10/2017 | Blom | F03D 7/0224 |
| 9,879,654 B2* | 1/2018 | Peiffer | B63B 43/06 |
| 9,976,539 B2* | 5/2018 | Daher Adegas | F03D 1/0675 |
| 10,161,383 B2* | 12/2018 | Pineda Amo | F03D 7/0224 |
| 10,267,293 B2* | 4/2019 | Peiffer | F03D 7/048 |
| 10,480,488 B2 | 11/2019 | Drossel et al. | |
| 10,669,987 B2* | 6/2020 | Pineda Amo | F03D 7/0224 |
| 2005/0147856 A1 | 7/2005 | Albrodt et al. | |
| 2010/0117361 A1* | 5/2010 | Christensen | F03D 7/0224 290/44 |
| 2010/0142237 A1 | 6/2010 | Yuan et al. | |
| 2010/0241280 A1* | 9/2010 | Garcia Barace | F03D 7/028 290/44 |
| 2014/0246855 A1 | 9/2014 | Vasak et al. | |
| 2014/0339828 A1* | 11/2014 | Peiffer | B63B 1/107 290/44 |
| 2015/0003984 A1* | 1/2015 | Pineda Amo | F03D 7/0224 416/43 |
| 2015/0130187 A1* | 5/2015 | Yin | H02P 9/04 290/44 |
| 2015/0292483 A1* | 10/2015 | Slack | F03D 7/045 290/44 |
| 2015/0354535 A1* | 12/2015 | Pineda Amo | F03D 7/042 416/1 |
| 2015/0361964 A1* | 12/2015 | Daher Adegas | F03D 7/0224 416/61 |
| 2016/0115941 A1* | 4/2016 | Marwaha | F03D 7/024 416/37 |
| 2017/0152836 A1* | 6/2017 | Kjær | F03D 7/0224 |
| 2018/0119672 A1* | 5/2018 | Peiffer | B63B 13/00 |
| 2019/0072072 A1* | 3/2019 | Fang | F03D 7/044 |
| 2019/0264653 A1* | 8/2019 | Pineda Amo | F03D 7/0224 |
| 2020/0248674 A1* | 8/2020 | Hawkins | F03D 7/0276 |

FOREIGN PATENT DOCUMENTS

| | | |
|---|---|---|
| DE | 10213792 A1 | 10/2003 |
| DE | 102017105165 A1 | 9/2018 |
| EP | 2365215 A1 | 9/2011 |
| EP | 3156646 A1 | 4/2017 |
| EP | 2933477 B1 | 3/2018 |
| WO | 2014/111614 A1 | 7/2014 |

* cited by examiner

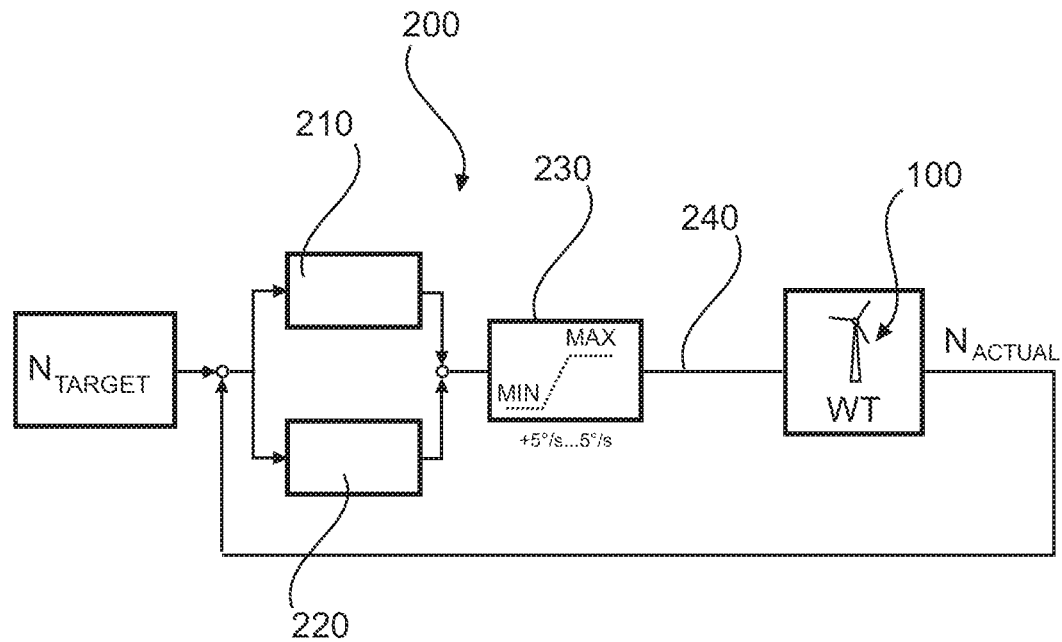
Fig. 2 - Prior art -
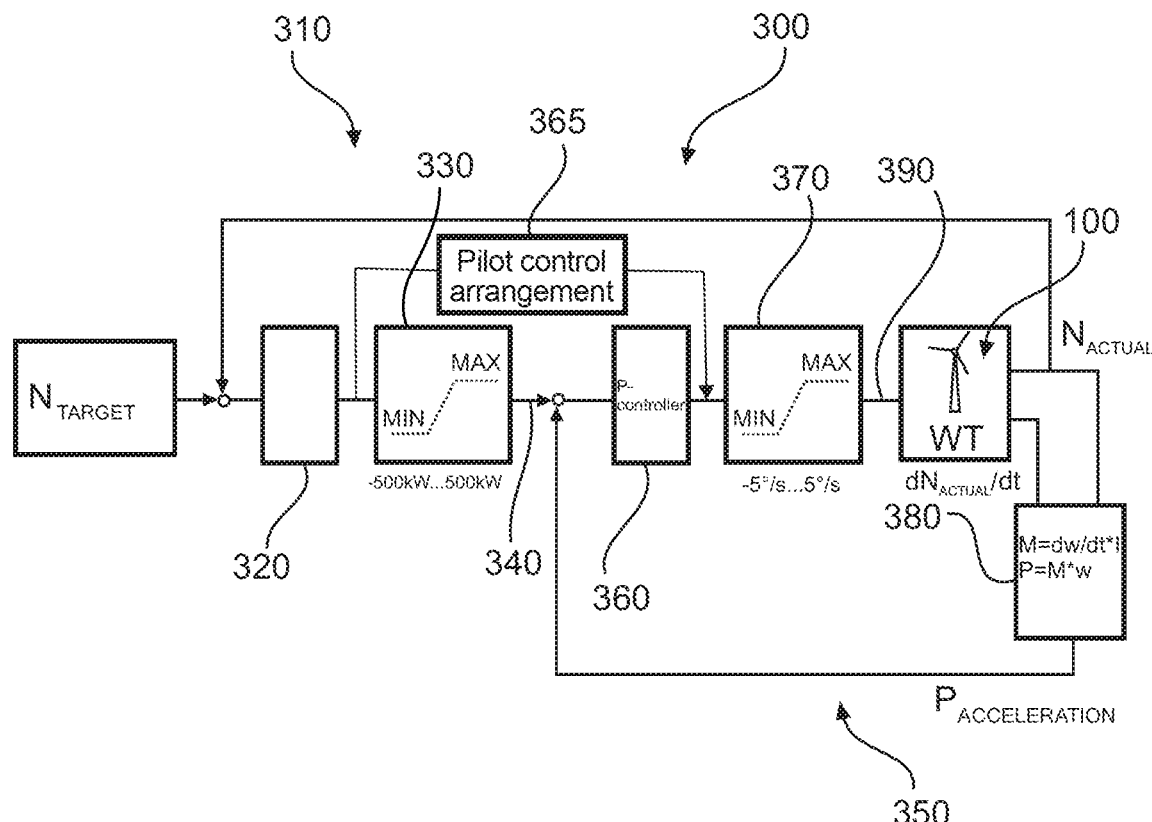
Fig. 3

CONTROLLER AND CONTROL METHOD FOR A WIND TURBINE

BACKGROUND

Technical Field

The present invention relates to a controller for a wind turbine having an aerodynamic rotor with at least one rotor blade, to an associated control method and also to a wind turbine and to a wind farm.

Description of the Related Art

Controllers for operating wind turbines are known. The most widespread are so-called pitch-controlled wind turbines in which the rotor blades of the rotor of the wind turbine are adjustable about their longitudinal axis, the so-called pitch axis. By changing the pitch angle, an aerodynamic power of the rotor blades is changed, as a result of which it is possible to restrict the power to rated power when the nominal wind is reached. To this end, it is known to provide so-called rotation speed controllers, as are schematically shown in FIG. 2, in order to approximately adhere to a target rotation speed $N_{target}$. The rotation speed controller 200 is designed to establish the target rotation speed $N_{target}$ as reference variable as far as possible, wherein an actual rotation speed $N_{actual}$ measured by the wind turbine 100 is fed back and the deviation is converted by means of a P controller 210 and a D controller 220 into a pitch rate to be set. The pitch rate is set to a target pitch rate 240 in a manner limited by a pitch rate limiter 230, the target pitch rate then being used to operate the wind turbine 100.

The quality of control of the rotation speed directly influences the shear loads of important components of the wind turbine, such as the tower and the rotor blades for example.

The German Patent and Trademark Office has searched the following prior art in the priority application relating to the present application: DE 10062025 C1, DE 2903819 A1, DE 10213792 A1, DE 102017105165 A1, US 2014/0246855 A1, US 2015/0130187 A1, EP 2933477 B1.

BRIEF SUMMARY

Provided is a controller for rotation speed control, which controller allows a reduction in the loads on the wind turbine.

According to a first aspect, the controller is for a wind turbine having an aerodynamic rotor with at least one rotor blade, wherein the controller is designed to control a rotation speed of the rotor of the wind turbine. The controller is designed as a cascade control arrangement and has an outer control loop and an inner control loop. The inner control loop receives an input signal which comprises a change in the rotation speed, an acceleration of the rotation speed, a function of the change in the rotation speed and/or a function of the acceleration of the rotation speed.

Designing the rotation speed control arrangement as a cascade control arrangement allows the slow, outer rotation speed control arrangement to allow, as a result, more rapid control by the provision of the inner control loop which has a reference variable that can be rapidly established. This creates the basis for effectively reducing loads acting on the wind turbine. In other words, the sluggish reference variable of the outer control loop is maintained, but the speed of the controller is compensated for by a rapidly changing reference variable of the inner control loop.

In one embodiment, a controlled variable of the outer control loop is provided as reference variable of the inner control loop. The manipulated variable of the outer control loop is accordingly a change in the rotation speed, an acceleration of the rotation speed, a function of the change in the rotation speed and/or a function of the acceleration of the rotation speed.

In one embodiment, the outer control loop is designed to limit a target value of the inner control loop, in particular the change in the rotation speed, the acceleration of the rotation speed, the function of the change in the rotation speed and/or the function of the acceleration of the rotation speed. Therefore, it is advantageously possible to limit a maximum acceleration acting on the rotor and also associated loads.

In one embodiment, the input signal of the inner control loop comprises a rotor acceleration power or a rotor acceleration torque, wherein the rotor acceleration power or the rotor acceleration torque describes the portion of a power received by the rotor of the wind turbine or of a torque that is converted into an acceleration of the rotor.

Here and below, the terms "power" and "torque" are used interchangeably since they can be converted one into the other by extremely simple conversions using the rotation speed. Accordingly, descriptions and advantages which are explained with respect to a power by way of example are likewise applicable to the associated torque, and vice versa.

In one embodiment, the input signal of the inner control loop comprises an aerodynamic power received by the rotor, wherein the aerodynamic power received by the rotor comprises a sum of a rotor acceleration power and at least one power received by a further component of the wind turbine, in particular a generator power of a generator of the wind turbine, wherein the rotor acceleration power describes the portion of a power received by the rotor of the wind turbine that is converted into an acceleration of the rotor.

In one embodiment, the outer control loop determines a deviation of an actual rotation speed of the rotor from a target rotation speed of the rotor as a system deviation. Therefore, the outer control loop acts in a manner corresponding to a conventional rotation speed control arrangement of the wind turbine, wherein considerably more rapid establishment of the desired variables is rendered possible by the configuration described herein as a cascaded control arrangement.

In one embodiment, the outer control loop generates a target value of a power or of a torque as manipulated variable. This power is preferably the acceleration power of the rotor or the received aerodynamic power. Similarly, consideration, as mentioned, with associated torques instead of with powers is possible.

The outer control loop preferably always generates, as target value, the physical variable which serves as an input signal for the inner control loop. This physical input signal generally comprises a change in the rotation speed, an acceleration of the rotation speed, a function of the change in the rotation speed, a function of the acceleration of the rotation speed, a rotor acceleration power, a rotor acceleration torque and/or an aerodynamic power.

In one embodiment, the target value of the power is limited upward and downward. Therefore, excessive control by the inner control loop, which can in turn lead to high loads for example, is avoided.

In one embodiment, the target value of the power is asymmetrically limited upward and downward. Therefore, for example, an acceleration power can be restricted to a value other than the braking power, this in turn resulting in a reduction in the loads which can occur at a maximum.

In one embodiment, the power comprises a rotor acceleration power, wherein the rotor acceleration power is limited to a rated power of the wind turbine, in particular to at most 20% of the rated power of the wind turbine. By limiting the rotor acceleration power, an excessive load acting due to the acceleration is avoided.

In one embodiment, the power comprises an aerodynamic rotor power, wherein the aerodynamic rotor power is limited to twice a rated power of the wind turbine, in particular to at most 120% of the rated power of the wind turbine. The aerodynamic rotor power comprises, in particular, a sum of the generator power and of the rotor acceleration power.

In one embodiment, the inner control loop generates, as manipulated variable, a pitch angle or a rate of change in a pitch angle of at least one of the rotor blades of the rotor. The pitch angles or rates of change in the pitch angle can be provided individually for each rotor blade or else collectively for all of the rotor blades jointly as manipulated variable.

In one embodiment, the target value for the rate of change in the pitch angle is limited, in particular to a value of between −18°/s and 18°/s and particularly preferably to a value of between −5°/s and +5°/s.

In one embodiment, the outer control loop and/or the inner control loop have/has a Proportional (P) controller.

In particular when a pitch angle is output as the target value, the inner control loop has, as an alternative or in addition, an Integral (I) controller. In particular, the controller can also be designed as a Proportional and Integral (PI) controller, advantageously particularly when the output is a blade angle instead of a pitch rate.

In one embodiment, the controller further has a calculation component or circuitry which is designed to determine a rotor acceleration power from a change in a measured actual rotation speed of the wind turbine using the rotor inertia.

In one embodiment, the controller further has a pilot control arrangement for pilot control of a pitch angle of at least one rotor blade, which pilot control arrangement is designed to prespecify, parallel to the inner control loop, a pitch angle and/or a rate of change in the pitch angle.

The aerodynamic target power or the target rotor acceleration allows a target blade angle or target pitch angle to be determined therefrom, for example in order to be able to perform pilot control before strong, impending gusts, which target blade angle or target pitch angle is offset against the actual blade angle or actual pitch angle to give a pilot control pitch rate.

The two pitch rates, that is to say the rate of change in the pitch angle on account of the inner control loop and also the rate of change in the pitch angle on account of the pilot control, run preferably in parallel, so that they are superimposed. A matter of designing the wind turbine is then to determine which of the two prespecified rates is implemented in which way by the installation. Owing to the pilot control provided in this aspect, it is possible to at least partially absorb extreme loads, as occur in the case of gusts in particular.

According to a further aspect, provided is a method for operating a wind turbine having an aerodynamic rotor with at least one rotor blade, wherein the method is designed to control a rotation speed of the rotor of the wind turbine. The method is designed as cascade control and has an outer control loop and an inner control loop, wherein the method comprises the following step: acquiring, by the inner control loop, an input signal which comprises a change in the rotation speed, an acceleration of the rotation speed, a function of the change in the rotation speed and/or a function of the acceleration of the rotation speed.

The method allows the same advantages to be achieved as are described for the controller. Similarly, the method, analogously and with associated advantages, can be combined with the refinements described herein as preferred.

According to a further aspect, provided is a wind turbine having a controller.

According to a further aspect, provided is a wind farm having a plurality of wind turbines.

BRIEF DESCRIPTION OF THE SEVERAL VIEWS OF THE DRAWINGS

Further advantages and exemplary embodiments are described below with reference to the appended figures, in which:

FIG. 2 shows, schematically and by way of example, a controller for rotation speed controllers of wind turbines, and FIG. 3 shows, schematically and by way of example, a controller.

DETAILED DESCRIPTION

Figure 1:
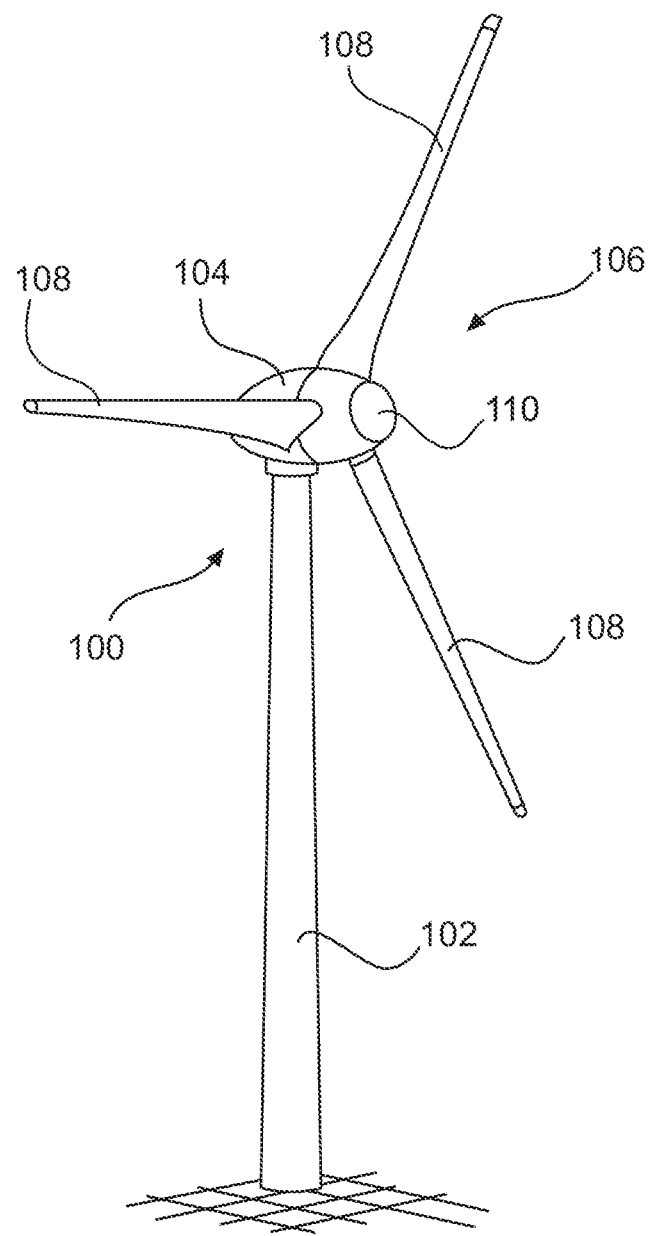
FIG. 1 shows, schematically and by way of example, a wind turbine.

FIG. 1 shows a schematic representation of a wind turbine according to the invention. The wind turbine 100 has a tower 102 and a nacelle 104 on the tower 102. An aerodynamic rotor 106 with three rotor blades 108 and a spinner 110 is provided on the nacelle 104. During operation of the wind turbine, the aerodynamic rotor 106 is set in a rotational motion by the wind, and therefore also turns an electrodynamic rotor of a generator that is directly or indirectly coupled to the aerodynamic rotor 106. The electrical generator is arranged in the nacelle 104 and generates electrical energy. The pitch angles of the rotor blades 108 can be changed by pitch motors at the rotor blade roots of the respective rotor blades 108.

FIG. 3 shows, schematically and by way of example, a controller 300 for a wind turbine 100, as is shown in FIG. 1 for example. The controller 300 includes circuitry that is designed as a cascade control arrangement and has an outer control loop 310 and an inner control loop 350. The controller 300 controls a rotation speed in the wind turbine to a target value $N_{target}$. To this end, the outer control loop 310 compares the actual rotation speed $N_{actual}$ with a target rotation speed $N_{target}$ to be established and generates a target value 340 for the rotor acceleration power $P_{acceleration\_target}$ by means of a signal, limited by a limiter 330, of a P controller 320.

The inner control loop 350 now performs control to the rotor acceleration power $P_{acceleration}$ and accordingly attempts to set the rotor blades of the wind turbine 100 in such a way that the rotor 106 accelerates as little as possible. To this end, an actual acceleration power $P_{acceleration}$ is determined by means of a calculation component 380 (or circuitry), for example on the basis of the the change in the rotor rotation speed with respect to time $dN_{actual}/dt$ by a calculation component 380. The difference between the target value 340 of the acceleration power $P_{acceleration\_target}$ and the ascertained actual value $P_{acceleration}$ is converted by a P controller 360 into a pitch rate to be set or a blade angle, to be set, of the rotor blades 108. The pitch rate to be set or the pitch angle to be set is limited by a limiter 370 and is then passed as target value 390 to the control arrangement of the wind turbine 100.

In this example, the calculation component 380 employs known physical relationships between the moment of inertia J known for the rotor, a torque M and rotation speed or angular velocity ω derived therefrom in order to calculate the actual acceleration power $P_{acceleration}$ from the change in the rotation speed.

Instead of the rotor acceleration power, as is described in the exemplary embodiment, it is also possible to use all of the aerodynamic power received by the rotor, that is to say with additional consideration of the power received by the generator. One advantage of the rotor acceleration power is, in many cases, that the variable is often usually already available for wind estimators used in control of wind turbines 100, that is to say extensive adaptation of the control of the wind turbine 100 is not required. Accordingly, it suffices merely to replace the known rotation speed controller with a controller 300. Wind estimators are known, for example, from the German patent publication DE 10 2017 105 165 A1.

As an alternative to powers, the controller 300 presented by way of example can also be implemented with torques or rotation speeds derived with respect to time. These solutions are identical apart from the aspect that the current rotation speed is included in the acceleration power. However, the way in which powers are converted into torques, and vice versa, is already sufficiently known.

The inner control loop 350 would alone lead to severe rotation speed errors over time, and therefore the outer control loop 310, which reacts considerably more slowly and sluggishly, generates a target value, which can deviate from 0 kW, for the acceleration power. If, for example, an excessive rotation speed situation prevails, that is to say that the actual rotation speed $N_{actual}$ is greater than the target rotation speed $N_{target}$, the target value 340 would be, for example, −200 kW. In this case, the inner control loop 350 would establish an approximate rotor acceleration power $P_{acceleration}$ of −200 kW, so that the rotation speed of the rotor 106 is reduced as a result.

Limiting the output of the rotation speed controller by the limiter 330 or 370 allows the maximum acceleration power to be restricted, this likewise having a load-reducing effect.

The controller 300 schematically shown in FIG. 3 can be particularly advantageously supplemented with a pilot control arrangement 365 arranged parallel to the inner control loop 350. The pilot control arrangement 365 can perform pilot control, for example, on impending gusts and accordingly actively intervene in pitch angle adjustment in addition to the control. Therefore, extreme loads that occur, as are the result of strong gusts, can be particularly effectively avoided.

In summary, the controller 300 is for controlling the rotation speed to a rotation speed target value $N_{target}$. The inner control loop 350 receives the aerodynamic power received by the rotor 106 or the acceleration power or, in simplified terms, also merely the rotor acceleration as controlled variable, wherein the pitch rate or, as an alternative, also a target rotor blade angle serves as manipulated variable. The outer control loop 310 controls, as controlled variable, the rotor rotation speed N, wherein a target value of the aerodynamic power, of the acceleration power or else of the target rotor acceleration are generated as manipulated variable for the inner control loop 350.

The invention claimed is:

1. A controller for a wind turbine having an aerodynamic rotor with at least one rotor blade, the controller comprising:
   circuitry forming a cascade control arrangement and having an outer control loop and an inner control loop, wherein the controller is configured to control a rotation speed of the aerodynamic rotor of the wind turbine,
   wherein the inner control loop is configured to receive one or more input signals indicative of one or more characteristics chosen from a change in the rotation speed, an acceleration of the rotation speed, a function of a change in the rotation speed and a function of an acceleration of the rotation speed,
   wherein the one or more input signals received by the inner control loop comprises a rotor acceleration power or a rotor acceleration torque.

2. The controller as claimed in claim 1, wherein a controlled variable of the outer control loop is provided as a reference variable of the inner control loop.

3. The controller as claimed in claim 2, wherein the outer control loop is configured to limit the reference variable of the inner control loop, wherein the reference variable is at least one value chosen among a change in the rotation speed, the acceleration of the rotation speed, the function of the change in the rotation speed, and the function of the acceleration of the rotation speed.

4. The controller as claimed in claim 1, wherein the one or more input signals received by the inner control loop comprises an aerodynamic power received by the aerodynamic rotor.

5. The controller as claimed in claim 1, wherein the outer control loop determines a deviation of an actual rotation speed of the aerodynamic rotor from a target rotation speed of the aerodynamic rotor as a system deviation.

6. The controller as claimed in claim 1, wherein the outer control loop generates a target value of a power or of a torque as manipulated variable.

7. The controller as claimed in claim 1, wherein the outer control loop generates a target value of a power, wherein the target value of the power is limited by an upper limit and a lower limit.

8. The controller as claimed in claim 7, wherein the target value of the power is asymmetrically limited by the upper limit and the lower limit.

9. The controller as claimed in claim 1, wherein the outer control loop generates a target value of a power, wherein the power comprises a rotor acceleration power,
   wherein the rotor acceleration power is limited to a rated power of the wind turbine.

10. The controller as claimed in claim 1, wherein the outer control loop generates a target value of a power, wherein the power comprises an aerodynamic rotor power,
    wherein the aerodynamic rotor power is limited to twice a rated power of the wind turbine.

11. The controller as claimed in claim 1, wherein the inner control loop generates, as a manipulated variable, a pitch angle or a rate of change in a pitch angle of at least one of the rotor blades of the aerodynamic rotor.

12. The controller as claimed in claim 1, wherein the inner control loop generates, as a manipulated variable, a rate of change in a pitch angle of at least one of the rotor blades of the aerodynamic rotor, wherein a target value for the manipulated variable for the rate of change in the pitch angle is limited to a value of between −18°/second and 18°/second.

13. The controller as claimed in claim 1, wherein at least one control loop chosen from the outer control loop and the inner control loop has a Proportional (P) controller or a Proportional and Integral (PI) controller.

14. The controller as claimed in claim 1, further comprising calculation circuitry configured to determine a rotor acceleration from a change in a measured actual rotation speed of the wind turbine using an inertia of the aerodynamic rotor.

15. The controller as claimed in claim 1, further comprising a pilot control arrangement for pilot control of a pitch angle of the at least one rotor blade, wherein the pilot control arrangement is configured to prespecify, parallel to the inner control loop, at least one characteristic chosen among a pitch angle and a rate of change in the pitch angle.

16. A method comprising:
   operating a wind turbine having an aerodynamic rotor with at least one rotor blade, wherein the operating comprises controlling a rotation speed of the rotor of the wind turbine, wherein the controlling comprises using a cascade control arrangement having an outer control loop and an inner control loop, wherein the controlling comprises:
   acquiring, by the inner control loop, an input signal indicative of one or more characteristics chosen from a change in the rotation speed, an acceleration of the rotation speed, a function of a change in the rotation speed and a function of an acceleration of the rotation speed,
   wherein the one or more input signals received by the inner control loop comprises a rotor acceleration power or a rotor acceleration torque.

17. A wind turbine comprising the controller as claimed in claim 1.

18. A wind farm comprising a plurality of wind turbines as claimed in claim 17.

19. The controller as claimed in claim 1, wherein the rotor acceleration power is 20% of the rated power of the wind turbine or less.

\* \* \* \* \*